Nov. 22, 1932.  G. HAMMER  1,888,500
REEL SUPPORT FOR HARVESTER BINDERS
Filed May 6, 1932  2 Sheets-Sheet 1
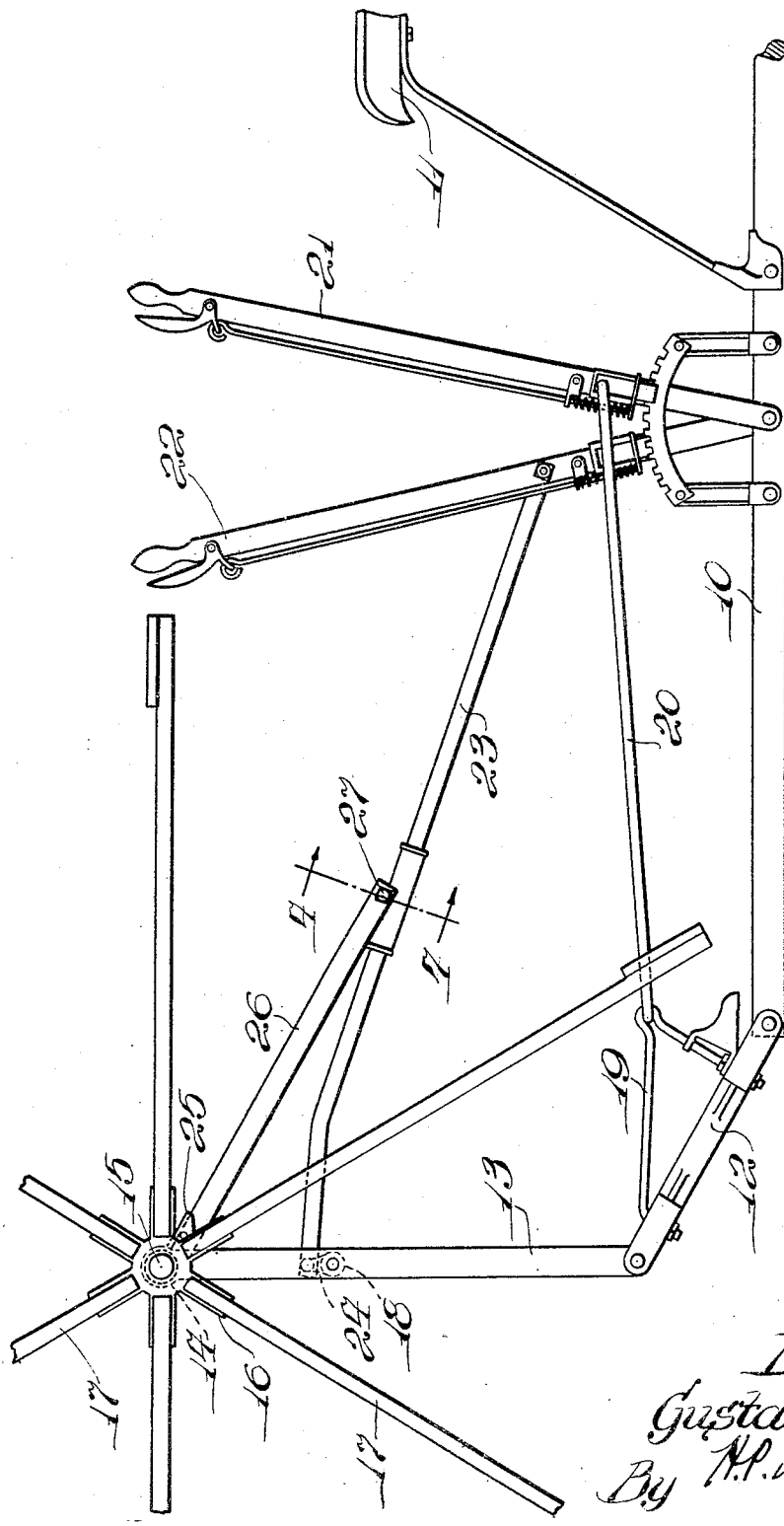
Inventor
Gustaf Hammer
By N.P. Doolittle
Atty.

Nov. 22, 1932.  G. HAMMER  1,888,500
REEL SUPPORT FOR HARVESTER BINDERS
Filed May 6, 1932    2 Sheets-Sheet 2
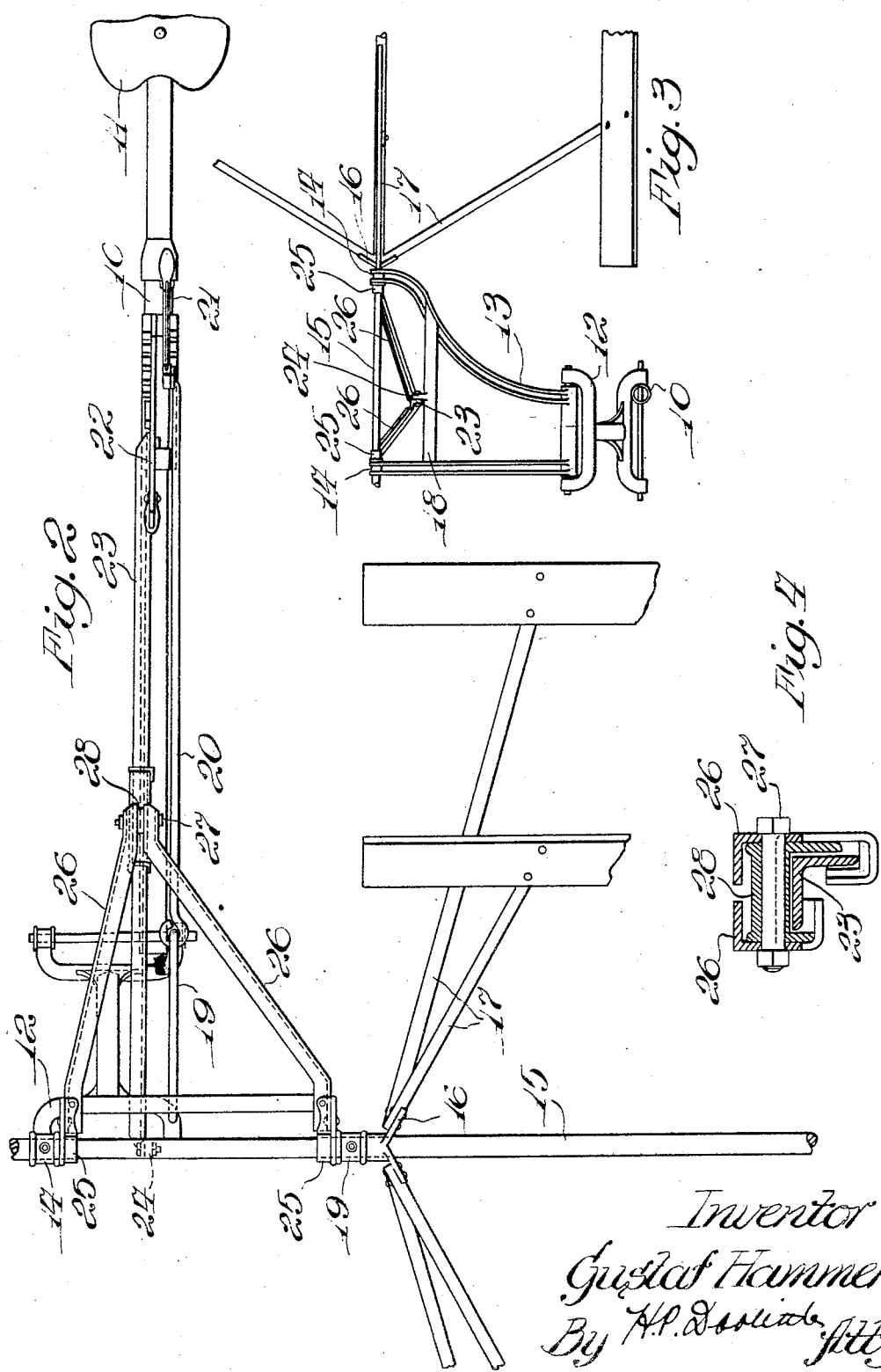
Inventor
Gustaf Hammer
By H.P. Doolittle Atty.

Patented Nov. 22, 1932

1,888,500

UNITED STATES PATENT OFFICE

GUSTAF HAMMER, OF CHICAGO, ILLINOIS, ASSIGNOR TO INTERNATIONAL HARVESTER COMPANY, A CORPORATION OF NEW JERSEY

REEL SUPPORT FOR HARVESTER BINDERS

Application filed May 6, 1932. Serial No. 609,616.

The invention relates to harvester binders and the like, and especially to an improved reel support therefor.

Such reels in standard binders are carried on a shaft supported by a hinged reel frame comprising two spaced points of support. In practice, it is found that such reel support is not amply sturdy properly to support the reel against objectionable play and wobble, that interfere with the efficient operation of the reel.

Accordingly, it is the main object of the invention to provide an improved reel support constructed in a manner to prevent play, wobble, or twisting out of line of the reel.

Such object is achieved by the structure hereinafter described and illustrated in the accompanying sheets of drawings, wherein:

Figure 1 is a side elevational view of so much of a harvester binder as is necessary to illustrate the improved reel support;

Figure 2 is a plan view of the structure shown in Figure 1;

Figure 3 is a front elevational view; and

Figure 4 is a sectional view of a detail, as seen along the line 4—4 in Figure 1, when looking in the direction of the arrows.

The binder shown is of the conventional type having a frame part in the form of the usual longitudinally disposed seat pipe 10, carrying at its rear end the operator's seat 11. To the forward end of the pipe 10 is pivotally connected a forwardly and upwardly extending lower reel frame 12 which in turn carries pivotally at its free end, an upwardly extending upper reel frame 13. As shown best in Figure 3, this upper reel frame 13 is formed of two, spaced, upwardly diverging arms, each terminating in transversely aligned journals 14 that serve to receive and carry the reel shaft 15 for rotation. The shaft 15 is rotated by any conventional gearing not shown, said shaft being provided at appropriate points with spiders 16 carrying the radial, reel arms 17. The bifurcated, upper reel frame 13, near its upper end, is stiffened by a cross brace 18.

The lower pivoted reel frame 12 carries a bail 19 to which is connected a reel lift rod 20 in turn connected to a hand lever mechanism 21 adjacent the seat 11, for raising and lowering the reel in the usual way. In a similar manner, the upper reel frame 13 can be moved to tilt the reel fore or aft through a lever mechanism 22 connected to operate a reel moving bars 23, in turn connected to a boss 24 on the cross brace 18.

Adjacent each journal 14 the reel shaft 15 carries spaced, turnable brackets 25, each having connected thereto, a brace 26, there being two such braces converging rearwardly and connected by a bolt 27 to a spacer slide block 28 through which the bolt passes. This block 28 includes depending flanges, as best shown in Figure 4, to embrace the reel moving bar 23, so that the block may freely slide on the bar 23. In accordance with this construction, the block 28 cannot accidentally jump off or separate from the bar 23 on which it slides.

Thus, is provided a brace structure 26 having sliding connection with the reel moving member 23, and pivotal connection at spaced points with the reel shaft 15, said points being above the boss 24 on the cross brace 18 forming the third point of a tripod brace structure to prevent twist in the reel support, and objectionable play, thus insuring at all times proper alignment of the reel shaft. The sliding connection for the braces 26 on the member 23 permits operation of the lever 22 in moving the reel fore or aft and yet the improved reel frame brace still can function. When the lever 22 is locked by its detent shown in Figure 1, the braces 26 are held to prevent disalignment of the journals 14 due to twisting tendencies on the bifurcated frame 13. Similarly, the lever 21 can be operated without disturbing the brace structure.

From this disclosure it can now be seen that structure has been provided which in a simple, practicable manner achieves the object of the invention heretofore recited.

It is the intention to cover herein all changes and modifications of the embodiment herein disclosed, which do not materially depart from the spirit and scope of the invention as hereinafter claimed.

What is claimed is:

1. In a binder, a pivotally mounted reel frame, a reel moving member pivotally connected thereto to move the frame, means to operate the member, and means having sliding connection with said member to prevent twisting of the reel frame.

2. In a binder, a main frame, a reel frame pivotally carried on the main frame, a reel shaft journaled in the reel frame, a lever, a reel moving bar pivotally connected between the lever and reel frame, and a brace for the reel shaft having sliding connection on the bar.

3. In a binder, a main frame, a reel frame having two spaced arms, said reel frame mounted for swinging movement, a reel shaft journaled in the upper ends of said arms, a cross brace included in the reel frame, a lever on the main frame, an operating bar connected between the lever and cross brace to move the reel frame, and a pair of brace arms loosely connected at one end at spaced points to the reel shaft and converging to have connection at their other ends to the operating bar.

4. In a binder, a main frame, a reel frame having two spaced arms, said reel frame mounted for swinging movement, a reel shaft journaled in the upper ends of said arms, a cross brace included in the reel frame, a lever on the main frame, an operating bar connected between the lever and cross brace to move the reel frame, a pair of brace arms loosely connected at one end at spaced points to the reel shaft and converging at their other ends, and a slide member carried on the operating bar, the converged ends of the brace arms being connected to the slide member.

5. In a binder, a main frame, a reel frame having two spaced arms, said reel frame mounted for swinging movement, a reel shaft journaled in the upper ends of said arms, a cross brace included in the reel frame, a lever on the main frame, an operating bar connected between the lever and cross brace to move the reel frame, and a pair of braces between the reel shaft and operating bar, said braces and operating bar constituting a tripod brace to prevent twisting of the reel frame and disalignment of the reel shaft.

6. In a binder, a main frame, a reel frame pivotally carried on the main frame, a reel shaft journaled in the reel frame, a lever, a reel moving bar pivotally connected between the lever and reel frame, a slide member on the bar, a brace pivotally connected between the reel shaft and slide member, and means to prevent the slide member from leaving the bar.

7. In a binder, a main frame, a reel frame pivotally carried on the main frame, a reel shaft journaled in the reel frame, a lever, a reel moving bar pivotally connected between the lever and reel frame, a slide member on the bar, a pair of braces connected to the slide and diverging to pivotally connect at spaced points to the shaft, and means to prevent the slide from leaving the bar.

8. In a binder, a main frame, a vertically disposed reel frame pivotally mounted on the main frame and having a pair of spaced arms the upper ends of which are provided with journals, a reel shaft mounted in said journals, a lever mounted on the main frame, a cross brace between the arms of the reel frame below the shaft, an operating bar connected between the lever and cross brace, a pair of braces connected at one end to the bar and diverging to have their other ends pivotally connected to the reel shaft one each adjacent each reel frame journal.

9. In a binder, a main frame, a vertically disposed reel frame pivotally mounted on the main frame and having a pair of spaced arms the upper ends of which are provided with journals, a reel shaft mounted in said journals, a lever mounted on the main frame, a cross brace between the arms of the reel frame below the shaft, an operating bar connected between the lever and cross brace, a slide member on the bar, a pair of braces connected at one end to the bar and diverging to have their other ends pivotally connected to the reel shaft one each adjacent each reel frame journal.

In testimony whereof I affix my signature.

GUSTAF HAMMER.